US008945280B2

(12) United States Patent
Holub et al.

(10) Patent No.: US 8,945,280 B2
(45) Date of Patent: Feb. 3, 2015

(54) METHOD TO DECREASE DECOMPOSITION PRODUCTS IN SOLUTIONS THAT ABSORB ACIDIC GASES SUCH AS CARBON DIOXIDE AND THE LIKE IN THE PRESENCE OF OXYGEN

(75) Inventors: Patrick E. Holub, Spring, TX (US); Robert A. Grigsby, Jr., Spring, TX (US); Larry R. White, The Woodlands, TX (US); James E. Critchfield, Austin, TX (US)

(73) Assignee: Huntsman Petrochemical LLC, The Woodlands, TX (US)

( * ) Notice: Subject to any disclaimer, the term of this patent is extended or adjusted under 35 U.S.C. 154(b) by 9 days.

(21) Appl. No.: 13/132,651

(22) PCT Filed: Dec. 3, 2009

(86) PCT No.: PCT/US2009/066531
§ 371 (c)(1),
(2), (4) Date: Jun. 3, 2011

(87) PCT Pub. No.: WO2010/077548
PCT Pub. Date: Jul. 8, 2010

(65) Prior Publication Data
US 2011/0232489 A1 Sep. 29, 2011

Related U.S. Application Data

(60) Provisional application No. 61/120,536, filed on Dec. 8, 2008.

(51) Int. Cl.
*B01D 53/14* (2006.01)
*C10G 21/20* (2006.01)
*C02F 1/26* (2006.01)
*C02F 1/68* (2006.01)
*C02F 101/38* (2006.01)
*C02F 103/18* (2006.01)
*C02F 103/34* (2006.01)

(52) U.S. Cl.
CPC ........ *B01D 53/1456* (2013.01); *B01D 53/1493* (2013.01); *C10G 21/20* (2013.01); *B01D 2252/604* (2013.01); *B01D 2252/606* (2013.01); *C02F 1/26* (2013.01); *C02F 1/68* (2013.01); *C02F 2101/38* (2013.01); *C02F 2103/18* (2013.01); *C02F 2103/343* (2013.01); *C08G 2650/50* (2013.01); *C10G 2300/44* (2013.01); *C10G 2300/80* (2013.01); *C10G 2300/201* (2013.01); *C10G 2300/202* (2013.01); *C10G 2300/207* (2013.01); *C10G 2300/4075* (2013.01)
USPC ............... 95/154; 423/228; 252/60; 252/184; 95/236

(58) Field of Classification Search
CPC ....................................................... B01D 53/14
USPC .......................................................... 95/154
See application file for complete search history.

(56) References Cited

U.S. PATENT DOCUMENTS

| 4,372,873 | A | * | 2/1983 | Nieh ........................ 252/389.54 |
| 4,663,124 | A | | 5/1987 | Incorvia |
| 4,766,186 | A | | 8/1988 | Sellstrom et al. |
| 4,814,104 | A | | 3/1989 | Kubek et al. |
| 5,766,548 | A | * | 6/1998 | Soria ............................... 422/16 |
| 6,517,700 | B2 | * | 2/2003 | Byszewski .................... 205/431 |
| 8,523,978 | B2 | | 9/2013 | Rojey et al. |
| 2004/0076542 | A1 | | 4/2004 | Chang et al. |
| 2006/0060498 | A1 | | 3/2006 | Buccolini |
| 2008/0159937 | A1 | * | 7/2008 | Ouimet .......................... 423/230 |

FOREIGN PATENT DOCUMENTS

EP 0 331 788 9/1989
WO 2007104856 9/2007

OTHER PUBLICATIONS

Rooney, P. C., Dupart, M. S., Bacon, T.R. "Oxygen's Role in Alkanolamine Degradation" *Hydrocarbon Processing*, Jul. 1998, pp. 109-113.

* cited by examiner

*Primary Examiner* — Duane Smith
*Assistant Examiner* — Joubert X Glover
(74) *Attorney, Agent, or Firm* — Huntsman International LLC

(57) ABSTRACT

An amine solvent solution that is useful in absorbing acid gases from a liquid or gas feed stream may have an amine additive added thereto. Additionally or alternatively, the amine additive may be added to a liquid or gas feed stream. The addition of the amine additive decreases the presence of amine-derived contaminants and/or degradation of amine in the amine solvent solution. As such, the amine solvent solution is available for effective reuse in treating the liquid or gas feed stream and there may be a decrease in the corrosion within an amine treating system.

19 Claims, 1 Drawing Sheet

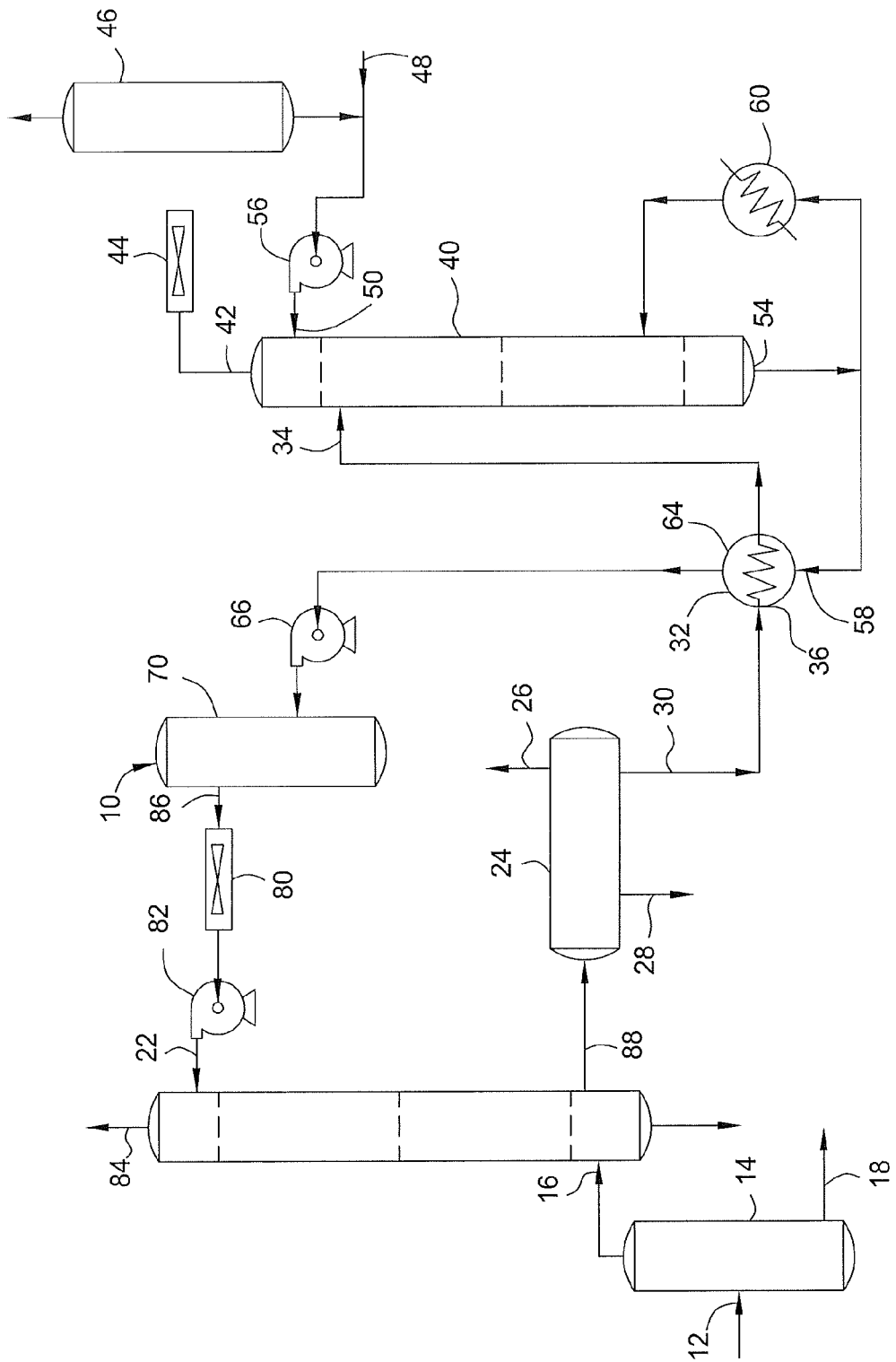

METHOD TO DECREASE DECOMPOSITION PRODUCTS IN SOLUTIONS THAT ABSORB ACIDIC GASES SUCH AS CARBON DIOXIDE AND THE LIKE IN THE PRESENCE OF OXYGEN

CROSS-REFERENCE TO RELATED APPLICATIONS

This application is the National Phase of International Application PCT/US2009/066531 filed Dec. 3, 2009 which designated the U.S. and which claims priority to U.S. Provisional App. Ser. No. 61/120,536 filed Dec. 8, 2008. The noted applications are incorporated herein by reference.

INCORPORATION BY REFERENCE

U.S. provisional application 61/120,536 is incorporated herein by reference in its entirety.

BACKGROUND OF THE DISCLOSURE

1. Field of the Disclosure

Embodiments described herein relate generally to amine solvent solutions that absorb acid gases and more particularly to additives that decrease the presence of amine-derived contaminants in- and/or degradation of such amine solvent solutions.

2. Description of the Related Art

Plants such as refineries, processing plants, industrial plants and the like, may include an amine treating system to treat liquid and/or gas feed streams. Generally, such feed stream treatment includes an amine solvent solution to absorb acid gases from the feed stream. Acid gases include gases such as hydrogen sulfide ($H_2S$), carbon disulfide ($CS_2$) carbonyl sulfide (COS), and carbon dioxide ($CO_2$). Acid gases may later be removed from the amine solvent solution to regenerated and recycle the amine solvent solution for additional use.

Amine-derived contaminants, however, can accumulate in the amine solvent solution. If left unchecked, these contaminants can have an adverse effect on the amine treating system. For instance, amine-derived contaminants are associated with a decrease in the amine solvent solution's ability to absorb acid gases and an increase in corrosion within the amine treating system.

Generally, amine-derived contaminants result from a reaction or association between the amine in the amine solvent solution with another molecule resulting in another contaminant or a reaction intermediate involving a contaminant. These other contaminants/intermediates include acid gases, oxygen, strong anions, carboxylic acids, and others. Contaminants such as acid gases may come from the feed stream being treated, but contaminants may come from any source such as the make-up water for the amine solvent solution or any other source.

One type of amine-derived contaminant is heat-stable salts. Heat-stable salts form when a strong anion, such as chloride, formate, or acetate, reacts with or binds an amine cation. The resultant salts are heat-stable because the addition of heat does not readily regenerate the amine solvent solution.

Another type of amine-derived contaminant is amine-derived degradation products. Generally, amine-derived degradation products result from the breakdown of amine molecules into a different chemical species. The chemistry of degradation product formation is complex, and in many cases, the reactions are irreversible. A simplified example included the reaction of oxygen or an acid gas with the amine eventually to form an amine-derived degradation product. Alternatively or additionally, oxygen or an acid gas may react with another contaminant to form an intermediate that reacts with the amine to form the amine-derived degradation product. Of course, formation of amine-derived degradation products is not limited to the forgoing, much simplified, examples.

Since there are many ways in which heat-stable salts and amine-derived degradation products can be produced, they can, and usually are, both be present in an amine treating system at the same time. Furthermore, amine treating systems can tolerate only so much accumulation of such amine-derived contaminants before it must be addressed. There are many different ways to clean an amine treating system once the contaminants are produced, but there remains a need for ways to avoid or to decrease amine-derived contaminants from forming in the first place.

SUMMARY OF THE INVENTION

An embodiment of the present invention is directed toward a composition comprising an amine additive, an amine solvent solution, and water. In an embodiment the amine additive is any suitable amine additive or combinations of amine additives such as a diamine, triamine, or any other suitable amine-containing material and may be selected from one or more of: ethyleneamine derivatives, substituted propylamines, polyoxyalkyleneamines, substituted piperazines, and derivatives thereof), and the amine solvent solution selected from one or more of: monoethanolamine, diethanolamine, triethanolamine, dimethylethanolamine, N-methyldiethanolamine, monomethylethanolamine, 2-(2-amino ethoxy)ethanol, aminoethylethanolamine, diisopropanolamine, piperazine, and derivatives thereof. The composition may be an amine-derived contaminant inhibitor, an amine degradation inhibitor, or both.

Another embodiment comprises a method. Generally, an amine additive may be added to amine solvent solution that is useful in treating liquid feed streams, gas feed streams, or both, although embodiments are not limited thereto. In response to adding the amine additive, the formation of amine-derived contaminants is decreased and/or degradation of the amine in the amine solvent solution is decreased. These decreases may be measured by comparison to a control that does not have an amine additive added thereto. The amine additive may inhibit the degradation and/or oxidation of an amine solvent solution, inhibit system corrosion, and/or inhibit formation of amine-derived contaminants.

The amine-derived contaminants formed in an amine additive free system may include amine-derived heat stable salts and/or degradation products such as bicine, THEED, or both, although amine-derived contaminants are not limited to these few examples. As amine-derived contaminants may be deceased in embodiments of the method, the amine solvent solution can be regenerated and reused without requiring fresh amine to be added to the solvent solution.

In some embodiments, amine additive may be an ethyleneamine derivative selected from one or more of: ethylenediamine; aminoethylethanolamine; diethylenetriamine; triethylenetetramine; tetraethylenepentamine; pentaethylenehexamine; 1,2-propylenediamine; N-(2-hydroxypropyl)ethylenediamine; N-(2-hydroxybutyl)ethylenediamine; N-(2-hydroxyethyl)-1,2-propylenediamine; N-(2-hydroxypropyl)-1,2-propylenediamine; and N-(2-hydroxybutyl)-1,2-propylenediamine, although embodiments are not so limited.

Furthermore, the amine solvent solution may include one or more of: monoethanolamine, diethanolamine, triethanolamine, dimethylethanolamine, N-methyldiethanolamine, monomethylethanolamine, 2-(2-amino ethoxy)ethanol, aminoethylethanolamine, diisopropanolamine, piperazine, and derivatives thereof, again where embodiments are not limited to these few examples.

BRIEF DESCRIPTION OF THE DRAWINGS

FIG. 1 is a schematic diagram of an amine treating system.

DETAILED DESCRIPTION

In the following detailed description of the embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Under certain conditions, the amine in an amine solvent solution (e.g. such as those used to absorb acid gases) may change into a less useable form such as one or more amine-derived contaminants. For instance, an amine treating system, such as one for treating a liquid or gas feed stream with the amine solvent solution, may provide conditions for degrading the amine and/or forming amine-derived contaminants. According to an embodiment of the present invention, an amine additive may be added to the amine solvent solution to reduce the presence of amine-derived contaminants and/or to reduce the amount of amine solvent solution that degrades into the amine-derived contaminants Embodiments, however, are not limited to adding the amine additive to the amine solvent solution; the amine additive may be added to the liquid or gas feed stream or both the feed stream and the amine solvent solution.

One type of amine-derived contaminant is heat-stable salts. Heat-stable salts are not just less-useable, they are associated with system corrosion and they bind the amine in the amine solvent solution making it unavailable for acid gas absorption. In an embodiment, the amine additive inhibits the formation of such heat-stable salts and/or keeps the amine solvent solution from degrading into heat-stable salts. A decrease in the presence of heat-stable salts may contribute to a decrease in system corrosion.

In an amine treating system, an amine molecule may react with a contaminant anion such as chloride, potassium, formate, and/or acetate to form heat-stable salts; embodiments, however, are not limited to these few examples. Heat-stable salts may also form in an amine treating system when oxygen is a contaminant. For instance, oxygen may oxidize the amine of the amine solvent solution to form acids, which then complex with cations (e.g. amine cations) to form heat-stable salts. Of course, these are but a few examples of how heat-stable salts may form in an amine treating system and embodiments are not limited thereto.

Amine-derived degradation products are another type of amine-derived contaminant. The chemistry for producing amine-derived degradation products is typically complex and is often irreversible. Furthermore, resultant amine-derived degradation products may be solvent dependent. For instance, in the presence of $CO_2$, monoethanolamine degrades to form hydroxyethyl ethylenediamine (HEED), diethanolamine (DEA) degrades to form tris hydroxyethyl ethylene diamine (THEED), and diisopropanolamine degrades to form hydroxymethyl propyl oxazolidone. Additionally, methyldiethanolamine (MDEA) can degrade to form DEA, which can then further degrade, and in the presence of oxygen MDEA can degrade to form bicine. There are many amines that may degrade and as many or more degradation products. For example, other known types of amine-derived degradation products include imidazolidones, oxazolidones, ethylenediamines, ureas, thioureas, piperzines, ethanolamines, and more. Thus, embodiments are not limited to the forgoing examples of amines and degradation products. Furthermore, in any instance there may be a combination multiple types of amine-derived contaminants such as amine-derived degradation products and/or heat-stable salts. As used herein degradation of an amine/amine solvent solution refers to amine degradation into any heat-stable and/or irreversible product such as heat-stable salts, amine-derived degradation products, and the like.

In an embodiment, an amine solvent solution includes an amine and water. In a particular embodiment, the amine includes one or more amines that are useful in treating a liquid or gas feed stream (in an amine treating system) with an amine solvent solution to remove acid gases from the feed stream. These amines may be selected from one or more of primary amines, secondary amines, and tertiary amines. In some embodiments one or more physical absorbents such as sulfolane or tetraglyme may be added to the amine solvent solution.

In some embodiments, the amine in the amine solvent solution may be one or more alkanolamines. Alkanolamines for treating a liquid or gas feed stream may be selected from, but are not limited to, one or more of: monoethanolamine (MEA), diethanolamine (DEA), triethanolamine (TEA), dimethylethanolamine (DMEA), methyldiethanolamine (MDEA), monomethylethanolamine (MMEA), 2-(2-aminoethoxy)ethanol, aminoethylethanolamine (AEEA), diisopropanolamine (DIPA), piperazine, and derivatives thereof.

In some embodiments, an amine additive is added to the amine solvent solution to decrease the presence of amine-derived contaminants- and/or to decrease the degradation of the amine in the amine solvent solution. Embodiments are not so limited however, and the amine additive may be added at any (or multiple) entry point(s) into an amine system such as the feed stream to be treated, make-up water, and the like. Suitable amine additives include any amine additive or combinations of amine additives that results in one or more of the afore-mentioned effects. Such suitable amine additives may be a diamine, triamine, or any other amine-containing material and may be selected from one or more of: ethyleneamine derivatives, substituted propylamines, polyoxyalkyleneamines, substituted piperazines, and derivatives thereof, although embodiments are not so limited.

In an embodiment, the amine additive added to an amine solvent solution may include an ethyleneamine derivative selected from one or more of: ethylenediamine (EDA); aminoethylethanolamine; diethylenetriamine (DETA); triethylenetetramine (TETA); tetraethylenepentamine (TEPA); pentaethylenehexamine; 1,2-propylenediamine; N-(2-hydroxypropyl)ethylenediamine; N-(2-hydroxybutyl)ethylenediamine; N-(2-hydroxyethyl)-1,2-propylenediamine; N-(2-hydroxypropyl)-1,2-propylenediamine; and N-(2-hydroxybutyl)-1,2-propylenediamine. In a particular embodiment, tetraethylenepentamine may be selected from one or more of: 4-(2-aminoethyl)-N-(2-aminoethyl)-N'-{2-{(2-aminoethyl)amino}ethyl}-1,2-ethandiamine) (AETETA), N-(2-aminoethyl)-N'-{2-{(2-aminoethyl)amino}ethyl}-1,2-ethandiamine), 1-(2-aminoethyl)-4-[(2-aminoethyl)amino]ethyl]-piperazine) (APEEDA), and 1-[2-[[2-aminoethyl)amino]

ethyl]-amino]ethyl]-piperazine) (PEDETA), although embodiments are not so limited.

The amine additive added to the amine solvent solution may include a substituted propylamine. Suitable substituted propylamines include one or more of: dimethylaminopropylamine (DMAPA), methoxypropylamine (MOPA), aminopropylmorpholine (APM), N,N-Dimethylamino ethyl 3-aminopropyl ether or (2-(2-[(3-aminopropyl)methylamino]ethoxy)ethyl)dimethylamine, although embodiments are not so limited.

Suitable polyoxyalkyleneamines amine additives include those having the formula:

wherein X is between 2 and 70. Non-limiting examples of such polyoxyalkyleneamines include JEFFAMINE® D-230 additive (NH$_2$CH(CH$_3$)CH$_2$—[OCH$_2$CH(CH$_3$)]$_{2.5}$—NH$_2$, Mol. Wt.≈230), JEFFAMINE® D-400 additive (NH$_2$CH(CH$_3$)CH$_2$—[OCH$_2$CH(CH$_3$)]$_{6.1}$—NH$_2$, Mol. Wt.≈430), JEFFAMINE® D-2000 additive (NH$_2$CH(CH$_3$)CH$_2$—[OCH$_2$CH(CH$_3$)]$_{33}$—NH$_2$, Mol. Wt.≈2,000), and other similar products made from an ethylene oxide backbone with a propylene oxide cap. JEFFAMINE® products are available from Huntsman, The Woodlands, Tex.

Suitable amine additives also include substituted piperazines selected from one or more of: 1-(2-aminoethyl)-4-[(2-aminoethyl)amino]ethyl]-piperazine) (APEEDA), 1-[2-[[2-aminoethyl)amino]ethyl]-amino]ethyl]-piperazine) (PEDETA), and N-aminoethylpiperazine (AEP), although embodiments are not limited thereto.

In any given embodiment, the amine additive may be any of the forgoing amine additives alone or in combination. In an embodiment, the amine additive (whether alone or in combination) is added in an amount such that its concentration is from about 0.005% to about 7% weight of the total composition of the amine solvent solution and the amine additive. In another embodiment, the amine additive (alone or in combination) is added in an amount from about 0.05% to about 3% weight of the total composition of the amine solvent solution and the amine additive. And in yet another embodiment, the amine additive (alone or in combination) is added in an amount from about 0.2% to about 1% weight of the total composition of the amine solvent solution and the amine additive. In one embodiment, the total amount of the amine additive relative to the total composition of the amine solvent solution and the amine additive is maintained constant throughout the gas treatment process, as in a continuous gas treatment process.

Referring to FIG. 1, a schematic diagram of an amine treating system is shown. In this example, the amine treating system is one for treating acid gases from processed hydrocarbon gases. Embodiments, however, are not limited to this example and an amine additive may be added to variety of amine treating systems. For instance, in some embodiments, the amine additive may be added to an amine treating system for removing acid gases, and in another embodiment the amine additive may be added to a carbon dioxide capture unit, although embodiments are not limited thereto.

In the treating system of FIG. 1, the feed stream 12 enters the amine treating system at a separator 14, where gases are separated from liquids. The feed stream 12 may be any feed stream such as a gas or a liquid, which perhaps also includes an amine additive. In an embodiment, the feed stream 12 is one that contains any combination of H$_2$S, CO$_2$, similar acid gases, and O$_2$. The feed gases 12 may be any type of gas including waste gas streams, such as flue gas streams, kiln gas, reverberatory furnace gas, regenerator off gas, sour gas, and combinations thereof. The feed gases are piped to an absorber inlet 16, and feed liquids are transmitted out of the separator 14 at a separator outlet 18.

In an absorber 20, the feed gases are in fluid communication with an amine solvent solution and an amine additive. The absorber 20 may be a column (or other mixing device) with a circulating liquid amine solvent solution and an amine additive introduced at an upper absorber inlet 22. Fluid communication may be obtained as the amine solvent solution and amine additive flow down trays or packing (not shown) in the absorber 20 and the feed gas migrates upwardly among the trays or packing from the absorber inlet 16. After interacting with the amine solvent solution and amine additive, the treated feed gases are transmitted from the absorber 20 through an upper absorber outlet 84.

The amine solvent solution and amine additive containing absorbed gases (e.g., H$_2$S and CO$_2$) is collected at the bottom of the absorber 20 and is transmitted through a lower absorber outlet 88 to a flash tank 24. In the flash tank 24, the amine solvent solution and amine additive are subjected to decreased pressure. Soluble gases are transmitted from a first outlet 26 of the flash tank 24 and hydrocarbon liquids are collected and transmitted from a second outlet 28 of the flash tank 24. The amine solvent solution and amine additive are transmitted through a third outlet 30 of the flash tank 24 to an inlet 36 of a heat exchanger 32. The amine solvent solution and amine additive are heated in the heat exchanger 32 and transmitted to an inlet 34 of a regenerator 40. In the regenerator 40, gases including H$_2$S and CO$_2$ are boiled off and transmitted through an upper regenerator outlet 42 for subsequent treatment. A reflux condenser 44 and a reflux accumulator 46 condense and accumulate for recirculation through regenerator 40 a condensate of the water contained in the overhead gases. Makeup water is introduced into the system at inlet 48. In an embodiment, the amine additive may enter the amine treating system via the makeup water. The makeup water and the condensate from accumulator 46 are pumped to a regenerator inlet 50 by a pump 56.

A portion of the amine solvent solution and amine additive is circulated from a lower regenerator outlet 54 through a reboiler 60. The amine solvent solution and amine additive are heated in the reboiler 60 to their boiling points. A second portion of the amine solvent solution and amine additive is collected from the regenerator 40 and transmitted to an inlet 58 of heat exchanger 32.

Amine solvent solution and amine additive are transmitted from an outlet 64 of the heat exchanger 32 by means of a pump 66 to a filter 70. A portion of the amine solvent solution and amine additive is filtered at the filter 70. The amine solvent solution and amine additive are then further cooled at amine cooler 80 and pumped by pump 82 to the absorber upper inlet 22. Thus, in an embodiment, the amine solvent solution and amine additive may be regenerated and reused to circulate within the amine treating system without requiring fresh amine to be added to the system to replenish the amine solvent solution due to the presence of amine-derived contaminants.

In general, it is desirous to conduct the process in temperatures between from about 0° C. to about 200° C., preferably from about 20° C. to about 150° C., and at pressures from about 0.01 psi to about 10,000 psi, preferably from about 0.1 psi and to 1500 psi.

In an embodiment, the amine additive may be added anywhere within the system such that the additive accumulates in the amine solvent solution. For instance, the amine additive may be added to the amine solvent solution before use in the amine treating system, it may be added to the feed stream, or it may be added to both. Furthermore, the amine additive may be added to the amine treating system via the makeup water or any other juncture in the amine treating system.

EXAMPLES

The following non-limiting examples are provided to further illustrate embodiments described herein. The examples, however, are not intended to be all-inclusive and are not intended to limit the scope of the embodiments described herein.

In the following examples, the presence of amine-derived contaminants was evaluated in test samples containing an amine solvent solution and an amine additive as compared to their presence in control samples without the amine additive. Generally control and test samples were prepared by adding a sample solution (test or control according to the particular example/experiment) to a 1-liter reaction flask equipped with a cold-water condenser, thermometer, and a sparger tube. The reaction flask was heated with a mantel; the sample solution therein was heated to about 90° C. during the course of experiment. A sparger tube was used to bubble a feed stream, air, through each sample solution at a rate of 0.25 liter/min. Deionized water was added to each sample solution as needed when evaporation of water from the sample solution was noticed.

The presence of amine-derived contaminants was determined in two ways. One way was to look at the samples to see if they changed color. Generally, samples were colorless at the start of the experiments and were visually observed for color change each day thereafter for seven days. If the color of the sample changed then amine-derived contaminants were present in that sample. The other way was to determine via ion chromatography the concentration of amine-derived contaminants in each sample solution. Generally, concentrations for each sample solution were determined before the experiment began and seven days thereafter.

Additionally, total amine content was determined for each sample; measurements were taken before the experiment began and seven days after heating. Total amine content was determined by titration and/or ion chromatography. Furthermore, in some experiments the percent of amine solvent solution was determined both before the experiment began and seven days thereafter. These percentages were determined via titration and/or ion chromatography. The results of quantitative analysis (e.g. chromatography/titration) were normalized to a water-free basis since the water varied in the samples.

Examples 1-4

With reference to Table 1 and Table 2, Example 1 is a control sample and Examples 2-4 are test samples, which illustrate the effectiveness of amine additive a tetraethylenepentamine (TEPA) when added to the amine solvent solution 2-(2-aminoethoxy)ethanol. In Examples 2-4, TEPA was used in 0.2-1.0% weight of the total test sample: the amine solvent solution, which includes water, and amine additive. 2-(2-aminoethoxy)ethanol and TEPA are available from Huntsman, The Woodlands, Tex.

Referring to Table 1, the control sample, Example 1, changed from clear to amber after one day and to brown after six days. The test samples, Examples 2-4, however, stayed clear for the entire seven day experiment. Thus, as determined by the lack of color change in Examples 2-4, small amounts of TEPA strongly decreases the formation of amine-derived contaminants.

TABLE 1

| Example # | 1 | 2 | 3 | 4 |
|---|---|---|---|---|
| 2-(2-aminoethoxy)ethanol (grams) | 400 | 398.4 | 356 | 392 |
| TEPA (grams) | 0 | 1.6 | 4.0 | 8.0 |
| TEPA,% | 0 | 0.2 | 0.5 | 1.0 |
| Water (grams) | 400 | 400 | 440 | 400 |
| Appearance | | | | |
| Start | Clear | Clear | Clear | Clear |
| Day 1 | Amber | Clear | Clear | Clear |
| Day 2 | Red | Clear | Clear | Clear |
| Day 3 | Red | Clear | Clear | Clear |
| Day 4 | Red | Clear | Clear | Clear |
| Day 5 | Red | Clear | Clear | Clear |
| Day 6 | Brown | Clear | Clear | Clear |
| Day 7 | Brown | Clear | Clear | Clear |

Referring to Table 2, the samples for Examples 1-4 were tested for the production of certain heat-stable salts and for total amine content. As expected, after seven days of incubating control sample, Example 1, there was a large increase in the concentration of heat-stable salts and a decrease in amine content. In contrast, in the test samples, Examples 2-4, less formate was formed and the other salts were not detected. Furthermore, the concentration of total amine (milliequivalents/gram) remained high in the test samples as compared to the control. As shown in Table 2, the total amine content of the control sample, Example 1, decreased from 9.66 to 5.36 meq/g, a drop of 4.3 meq/g, whereas in Example 4 adding 1% TEPA resulted in only a 1.1 meq/g drop.

TABLE 2

Table 2 - 2-(2-aminoethoxy)ethanol analytical results with TEPA - Water free basis.

| | Example # | | | | | | | |
|---|---|---|---|---|---|---|---|---|
| | 1 | | 2 | | 3 | | 4 | |
| | TEPA,% | | | | | | | |
| | 0.0 | | 0.2 | | 0.5 | | 1.0 | |
| Test results | Day 0 | Day 7 | Day 0 | Day 7 | Day 0 | Day 7 | Day 0 | Day 7 |
| Formate, (ppm) | 15 | 17,190 | 14 | 2,189 | 13 | 1,520 | 7 | 367 |
| Glycolate, (ppm) | 0 | 1,415 | 0 | 0 | 0 | 0 | 0 | 0 |
| Lactate, (ppm) | 0 | 19,106 | 0 | 0 | 0 | 0 | 0 | 0 |
| Total Amine, (meq/g) | 9.66 | 5.36 | 10.37 | 9.61 | 9.54 | 9.50 | 10.67 | 9.57 |

Examples 5-7

With reference to Table 3 and Table 4, Example 5 is a control sample (without an amine additive) and Examples 6 and 7 test samples with the amine additive TEPA added thereto. In Examples 6 and 7, TEPA was added in 0.2% and 1.0% of the total solution respectively. The amine solvent solution tested in these examples was methyldiethanolamine (MDEA), which is available from Huntsman, The Woodlands, Tex.

Referring to Table 3, discoloration was observed in the control sample on day 2 with dark discoloration on day 6. In contrast, the test sample Example 6 was lightly colored on day 7, whereas test sample Example 7 remained colorless for the duration of the experiment. Thus, again, as compared to the control sample, test samples had little or no discoloration, which indicates that the amine additive decreased or prevented amine-derived contaminants from forming.

TABLE 3

| Example # | 5 | 6 | 7 |
|---|---|---|---|
| MDEA (grams) | 400 | 398.4 | 352 |
| TEPA (grams) | 0 | 1.6 | 8.0 |
| TEPA, % | 0 | 0.2 | 1.0 |
| Water (grams) | 400 | 400 | 440 |
| Appearance | | | |
| Start | Clear | Clear | Clear |
| Day 1 | Clear | Clear | Clear |
| Day 2 | Amber | Clear | Clear |
| Day 3 | Amber | Clear | Clear |
| Day 4 | Amber | Clear | Clear |
| Day 5 | Amber | Clear | Clear |
| Day 6 | Brown | Clear | Clear |
| Day 7 | Sparger broke | Amber | Clear |

As shown in Table 4, the addition of TEPA to test samples decreased both heat-stable salt formation and drop in amine strength. For example, in Example 5, the control sample the ppm of each salt increased after 7 days, but in comparison, Examples 6 and 7, which were test samples, the concentration of heat stable salts remained low. Furthermore, total amine concentration dropped in the control but the drop observed in the test samples was comparatively small. In these Examples, the percent of amine solvent solution was also measured after 7-days. In the control sample there was close to a 30% decrease in amine solvent solution. In contrast, in the test samples the amine solvent solution decreased a maximum of only about 3%. Taken together, these results indicate that in the presence of TEPA, the amine solvent solution does not degrade as readily and amine-derived contaminants do not form as readily as compared to an amine solvent solution that is TEPA-free.

TABLE 4

| | TEPA % | | | | | |
|---|---|---|---|---|---|---|
| | 0 | | 0.2 | | 1 | |
| | Example # | | | | | |
| | 5 | | 6 | | 7 | |
| | Day 0 | Day 7 | Day 0 | Day 7 | Day 0 | Day 7 |
| Acetate, ppm | 3 | 228 | 0 | 13 | 6 | 4 |
| Glycolate, ppm | 0 | 703 | 0 | 56 | 0 | 0 |
| Lactate, ppm | 0 | 434 | 0 | 28 | 4 | 0 |
| MDEA, % | 100 | 71.4 | 100 | 98.8 | 100 | 97.0 |
| Total Amine, meq/g | 8.4 | 7.6 | 9.0 | 8.3 | 8.6 | 8.5 |

Examples 8-11

With reference to Table 5 and Table 6, Example 8 is a control sample of amine solvent solution monoethanolamine (MEA) and Examples 9-11 are test samples having the amine additive TEPA added to MEA. The concentration of TEPA in Examples 9-11 was 0.2-1.0% weight of the total sample solution.

Referring to Table 5 below, TEPA did not have a clear-cut effect on preventing sample discoloration. Nonetheless, as is shown in Table 6, TEPA did affect salt formation in the test samples.

TABLE 5

| Example # | 8 | 9 | 10 | 11 |
|---|---|---|---|---|
| MEA (grams) | 400 | 358.4 | 396 | 392 |
| TEPA (grams) | 0 | 1.6 | 4.0 | 8.0 |
| TEPA, % | 0 | 0.2 | 0.5 | 1.0 |
| Water (grams) | 400 | 440 | 400 | 400 |
| Appearance | | | | |
| Start | Clear | Clear | Clear | Clear |
| Day 1 | Amber | Red | Clear | Amber |
| Day 2 | Red | Brown | Amber | Red |
| Day 3 | Red | Dark brown | Red | Red |
| Day 4 | Red | Dark brown | Red | Red |
| Day 5 | Red | Dark brown | Red | Red |
| Day 6 | Red | Dark brown | Red | Red |
| Day 7 | Red | Dark brown | Red | Red |

Referring to Table 6, amine-derived contaminants such as acetate, formate, glycolate, and lactate were decreased in the test samples as compared to the control. Furthermore, MEA amine strength remained relatively high in the test samples as compared to the control.

TABLE 6

| | Example | | | | | | | |
|---|---|---|---|---|---|---|---|---|
| | 8 | | 9 | | 10 | | 11 | |
| | | | | TEPA, % | | | | |
| | 0 | | 0.2 | | 0.5 | | 1.0 | |
| | Day 0 | Day 7 | Day 0 | Day 7 | Day 0 | Day 7 | Day 0 | Day 7 |
| Acetate, (ppm) | 0 | 1,568 | 0 | 718 | 0 | 344 | 0 | 455 |
| Formate, (ppm) | 10 | 37,523 | 6 | 9,633 | 1 | 15,188 | 8 | 13,925 |
| Glycolate, (ppm) | 1 | 6,813 | 0 | 2,427 | 0 | 1,316 | 0 | 1,227 |
| Lactate, (ppm) | 0 | 8,745 | 0 | 3,473 | 0 | 2,812 | 0 | 2,665 |
| MEA, % | 100 | 59.2 | 100 | 78.0 | 100 | 86.4 | 100 | 89.0 |
| total amine meq/g | 16.4 | 8.5 | 15.5 | 12.5 | 17.2 | 14.2 | 17.1 | 14.2 |

Examples 12-14

With reference to Table 7, Examples 12 through 14 were completed to test other amines in MDEA solutions such as dimethylaminopropylamine (DMAPA), JEFFAMINE® D-230 additive, and aminoethylethanolamine (AEEA). Each of the forgoing chemicals is available from Huntsman. These experiments were run in the same manner as the earlier experiments. The results are presented on a water-free basis due to slight differences in water content of the final samples solutions. As shown in Table 7, DMAPA, JEFFAMINE® D-230 additive, AEEA, and TEPA (from Example 7) all decrease the loss of total amine content of the final solutions.

TABLE 7

| Example | 5 | 12 | 13 | 14 | 7 |
|---|---|---|---|---|---|
| Amine solvent solution | MDEA | MDEA | MDEA | MDEA | MDEA |
| Amine additive | 0 | DMAPA | D-230 | AEEA | TEPA |
| amine additive in solution, wt. % | 0 | 1 | 1 | 1 | 1 |
| After 7 days of incubating | | | | | |
| drop in total amine content, % | 10% | 0.7% | 1.8% | 5.2% | 1.2 |

Examples 15-18

Examples 15 through 18 were completed to test other amine additives such as DMAPA, JEFFAMINE® D-230 additive, and AEEA in 2-(2-aminoethoxy)ethanol amine solvent solution. These experiments were run in the same manner as the earlier experiments. The results are presented on a water-free basis due to slight differences in water content of the final sample solutions. As shown in Table 8, DMAPA, JEFFAMINE® D-230 additive, AEEA, and TEPA (from Example 7) decrease the loss of total amine content of the amine solvent solution versus not adding an amine additive (Example 1).

TABLE 8

| | Example | | | | | |
|---|---|---|---|---|---|---|
| | 1 | 15 | 16 | 17 | 3 | 18 |
| Amine solvent solution | 2-(2-aminoethoxy)ethanol | | | | | |
| Amine Additive | 0 | DMAPA | D-230 | AEEA | TEPA | AEEA |
| amine additive in solution, wt. % | 0 | 0.5 | 0.5 | 0.5 | 0.5 | 1.0 |
| After 7 days of testing | | | | | | |
| drop in total amine content, % | 45% | 14.6% | 27.0% | 36.0% | 0.4% | 5.2% |

Examples 19-21

Examples 19 through 21 were completed to test other amine additives such as DMAPA, JEFFAMINE® D-230 additive, and AEEA in MEA amine solvent solution. These experiments were run in the same manner as the earlier experiments. The results are presented on a water free basis due to slight differences in water content of the final sample solutions. As shown in Table 9, DMAPA, JEFFAMINE® D-230 additive, AEEA, and TEPA (from Example 7) decrease the loss of total amine content of the amine solvent solution versus not adding any other amine additive to the solution (Example 8). Formate salt was significantly decreased in samples where JEFFAMINE® D-230 additive (Example 20) or TEPA was used (Example 9).

TABLE 9

| Example | 8 | 19 | 20 | 21 | 9 |
|---|---|---|---|---|---|
| Amine solvent solution | MEA | MEA | MEA | MEA | MEA |
| Amine Additive | 0 | DMAPA | D-230 | AEEA | TEPA |
| Amine additive in solution, wt. % | 0 | 0.2 | 0.2 | 0.2 | 0.2 |
| After 7 days of testing | | | | | | |
| Formate, (ppm) | 37,513 | 25,133 | 6,234 | 32,667 | 9,627 |
| drop in total amine content, % | 48% | 29.0% | 8.8% | 38.2% | 19.4% |

In the forgoing embodiments, formation of amine-derived contaminants, loss of amine content, and/or loss in the percentage of amine were decreased in response to the addition of an amine additive added to an amine solvent solution. These results may translate to commercial/industrial applications, where decreasing amine-derived contaminant formation and maintaining amine solvent concentration may help decrease poor system performance and corrosion.

Examples 22-25

Another set of experiments, were conducted in an operating plant with an amine treating system. The amine treating system of the plant was similar to the system of FIG. 1. In this case, however, there were two amine treating systems (System 1 and System 2) each operating with a circulation rate of 100 gallons per minute. Furthermore, the same gas feed stream was treated by both systems. For instance, referring back to FIG. 1, feed stream 12 was split such that a portion went to System 1 and the remainder went to System 2. The amine solvent solution circulating through both systems was a blend of MDEA, DEA, and water, the weight % of amine in the blend was 45% of the total weight of the solvent solution. System 1 was the test system having a dose of the amine additive TEPA added thereto and System 2 was the control.

At the time the experiments were run, the System 1 was in the process of start-up whereas System 2 had been operating for approximately 45 days. Thus, at the beginning of the experiments, amine-derived contaminants in System 1 (Example 22) were relatively low. But as can be seen in Example 24, a considerable amount of amine-derived contaminants had already built-up in System 2 over the prior 45 days. In these experiments, concentrations of the amine additive were determined by liquid chromatography/mass spectrometry and concentrations of the amine-derived contaminants bicine and formate were determined by ion chromatography whereas concentrations of the amine-derived contaminant THEED were determined by liquid chromatography. Example results were normalized to a water free basis.

Referring to Table 10, after operating for 2 weeks, each system was sampled and tested as described above. Notable, results obtained in an operating system confirm what was observed in the laboratory. For example, in control System 2, amine-derived contaminants, bicine, formate, and THEED, each increased over the two weeks with bicine increasing by 3,304 ppm, formates increasing by 415 ppm, and THEED increasing by 1,704 ppm. In contrast, in System 1 bicine increased by a mere 19 ppm, formate increased by 307 ppm, and THEED increased by only 323 ppm. It was noted that the anions formed in System 1 were primarily formates with no appreciable amounts of other anions being found.

TABLE 10

| | System 1 | | System 2 | |
|---|---|---|---|---|
| Example | 22 | 23 | 24 | 25 |
| Days | 0 | 14 | 0 | 14 |
| Amine solvent solution Blend | MDEA and DEA | | | |
| Amine additive, ppm | 1,400 | 350 | 0 | 0 |
| Bicine, ppm | 29 | 48 | 3,516 | 6,820 |
| Formate, ppm | 119 | 426 | 419 | 834 |
| THEED, ppm | 112 | 435 | 2,846 | 4,550 |

Thus, in response to the addition of the amine additive TEPA, both amine-derived contaminant formation and amine degradation decreased in the amine solvent solution as compared to amine-additive free system. Amine additives can thereby act as degradation inhibitors, amine-derived contaminant inhibitors, or both. When amine-derived contaminants do not build up and the amine in the solvent solution does not become depleted, the system operates more efficiently, does not suffer from as much corrosion, and can be operated for a longer time period without the need of adding fresh amine to the solvent solution. Thus, amine additives may also be corrosion inhibitors.

The above disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited; by the foregoing detailed description.

What is claimed is:

1. A method comprising:
   treating a liquid or gas feed stream with an amine solvent solution having one or more alkanolamines;
   adding an amine additive to the amine solvent solution, the liquid or gas feed stream, or both, wherein the amine additive includes tetraethylenepentamine, and wherein the tetraethylenepentamine is selected from the group consisting of: N-(2-aminoethyl)-N'-{2-{(2-aminoethyl)amino}ethyl}-1,2-ethanediamine), 4-(2-aminoethyl)-N-(2-aminoethyl)-N'-{2-{(2-aminoethyl)amino}ethyl}-1,2-ethanediamine), 1-(2-aminoethyl)-4-[[(2-aminoethyl)amino]ethyl]-piperazine), 1-[2-[[(2-aminoethyl)amino]ethyl]-amino]ethyl]-piperazine, and combinations thereof; and
   in response thereto, decreasing the presence of an amine-derived contaminant, decreasing degradation of the amine in the amine solvent solution, or both as compared to that which would have occurred in an amine additive-free amine solvent solution, liquid or gas, or both.

2. The method of claim 1 wherein decreasing the presence of an amine-derived contaminant includes decreasing the presence of a heat stable salt, amine-derived degradation product, or both in an amine treating system such that the amine solvent solution containing the amine additive can be regenerated and reused within the amine treating system without requiring fresh amine to be added to replenish the amine solvent solution due to the formation of amine-derived contaminants.

3. The method of claim 2 wherein adding the amine additive to the amine solvent solution, treated liquid or gas, or both includes adding the amine additive to the amine solvent solution, treated liquid or gas, or both at any juncture in the amine treating system.

4. The method of claim 1 wherein adding an amine additive includes adding the amine additive in an amount of from 0.005% to 7% of the total composition of the amine solvent solution and the amine additive.

5. The method of claim 1 wherein adding an amine additive includes adding the amine additive in an amount of from 0.05% to 3% of the total composition of the amine solvent solution and the amine additive.

6. The method of claim 1 wherein adding an amine additive includes adding an amine additive in an amount of from 0.2% to 1% of the total composition of the amine solvent solution and the amine additive.

7. The method of claim 1, wherein treating a liquid or gas feed stream with an amine solvent solution having one or more alkanolamines includes treating the liquid or gas feed stream with an amine solvent solution selected from the group consisting of: monoethanolamine, diethanolamine, triethanolamine, dimethylethanolamine, N-methyldiethanolamine, monomethylethanolamine, 2-(2-aminoethoxy)ethanol, aminoethylethanolamine, diisopropanolamine, derivatives thereof, and combinations thereof.

8. The method of claim 1, wherein treating a liquid or gas feed stream with an amine solvent solution includes absorbing acid gases from the liquid or gas feed stream, and wherein adding the amine additive to the amine solvent solution includes adding an amine additive that is an amine degradation inhibitor, amine-derived contaminant inhibitor, or a corrosion inhibitor.

9. The method of claim 1 wherein decreasing the formation of amine-derived contaminants includes decreasing the formation of amine-derived heat-stable salts, amine-derived degradation products, or both.

10. A composition comprising:
   an amine additive comprising tetraethylenepentamine, wherein the tetraethylenepentamine is selected from the group consisting of: N-(2-aminoethyl)-N'-{2-{(2-aminoethyl)amino}ethyl}-1,2-ethanediamine), 4-(2-aminoethyl)-N-(2-aminoethyl)-N'-{2-{(2-amino}ethyl}-1,2-ethanediamine), 1-(2-aminoethyl)-4-[[(2-aminoethyl)amino]ethyl]-piperazine), 1-[2-[[(2-aminoethyl)amino]ethyl]-amino]ethyl]-piperazine, and combinations thereof;
   an amine solvent solution selected from the group consisting of: monoethanolamine, diethanolamine, triethanolamine, dimethylethanolamine, N-methyldiethanolamine, monomethylethanolamine, 2-(2-aminoethoxy)ethanol, aminoethylethanolamine, diisopropanolamine, derivatives thereof, and combinations thereof; and
   water.

11. The composition of claim 10 wherein the amine additive is from 0.05% to 3% of the total composition.

12. The composition of claim 10 wherein the composition is an amine-derived contaminant inhibitor.

13. The composition of claim 10 wherein the composition is an amine degradation inhibitor.

14. The composition of claim 10, wherein the amine solvent solution includes an amine selected from the group consisting of 2-(2-aminoethoxy)ethanol, methyldiethanolamine, and monoethanolamine.

15. The composition of claim 10, wherein the amine additive is from 0.05% to 3% of the total composition.

16. The composition of claim 15, wherein the amine solvent solution includes an amine selected from the group consisting of 2-(2-aminoethoxy)ethanol, methyldiethanolamine, and monoethanolamine.

17. The method of claim 1, wherein adding an amine additive includes adding the amine additive in an amount of from 0.05% to 3% of the total composition of the amine solvent solution and the amine additive.

18. The method of claim 17, wherein the one or more alkanolamines is selected from the group consisting of: monoethanolamine, N-methyldiethanolamine, 2-(2-aminoethoxy)ethanol, derivatives thereof, and combinations thereof.

19. A method of treating a feed stream, comprising:
   mixing the feed stream with an amine solvent solution having one or more alkanolamines;
   adding an amine additive to the amine solvent solution, the feed stream, or both, wherein the amine additive includes a tetraethylenepentamine, and wherein the tetraethylenepentamine is selected from the group consisting of: N-(2-aminoethyl)-N'-{2-{(2-aminoethyl)amino}ethyl}-1,2-ethanediamine), 4-(2-aminoethyl)-N-(2-aminoethyl)-N'-{2-{(2-aminoethyl)amino}ethyl}-1,2-ethanediamine), 1-(2-aminoethyl)-4-[[(2-aminoethyl)amino]ethyl]-piperazine), 1-[2-[[(2-aminoethyl)amino]ethyl]-amino]ethyl]-piperazine, and combinations thereof.

* * * * *